United States Patent [19]

Stievenart et al.

[11] 4,298,272
[45] Nov. 3, 1981

[54] DAYLIGHT REPROGRAPHIC CAMERA

[75] Inventors: Emile F. Stievenart, Hoboken; Hugo F. Deconinck, Deurne-Zuid, both of Belgium

[73] Assignee: AGFA-Gevaert N.V., Mortsel, Belgium

[21] Appl. No.: 96,497

[22] Filed: Nov. 21, 1979

[30] Foreign Application Priority Data

Nov. 23, 1978 [GB] United Kingdom ............... 45765/78

[51] Int. Cl.³ .............................................. G03B 29/00
[52] U.S. Cl. ......................................... 355/28; 355/65
[58] Field of Search ............................. 355/18, 27–29, 355/43, 64, 65

[56] References Cited
U.S. PATENT DOCUMENTS 2,705,907 4/1955 Caps et al. ......................... 355/28 X
3,467,469 9/1969 Hastings et al. ................... 355/28 X

FOREIGN PATENT DOCUMENTS 2253125 5/1974 Fed. Rep. of Germany .

Primary Examiner—Richard A. Wintercorn
Attorney, Agent, or Firm—William J. Daniel

[57] ABSTRACT

A reprographic camera suited for use in daylight conditions has a light-tight casing mounted on its rear-side in which casing is provided with dispensing means for dispensing the required amount of photosensitive material from a supply roll contained therein, a positioning mechanism for positioning the photosensitive material in the middle of the image plane and an optical processing station. The dispensing and positioning are controlled by synchronous motors which are energized for an adjustable period of time which depends on the length of sensitive material to be dispensed and positioned.

11 Claims, 4 Drawing Figures

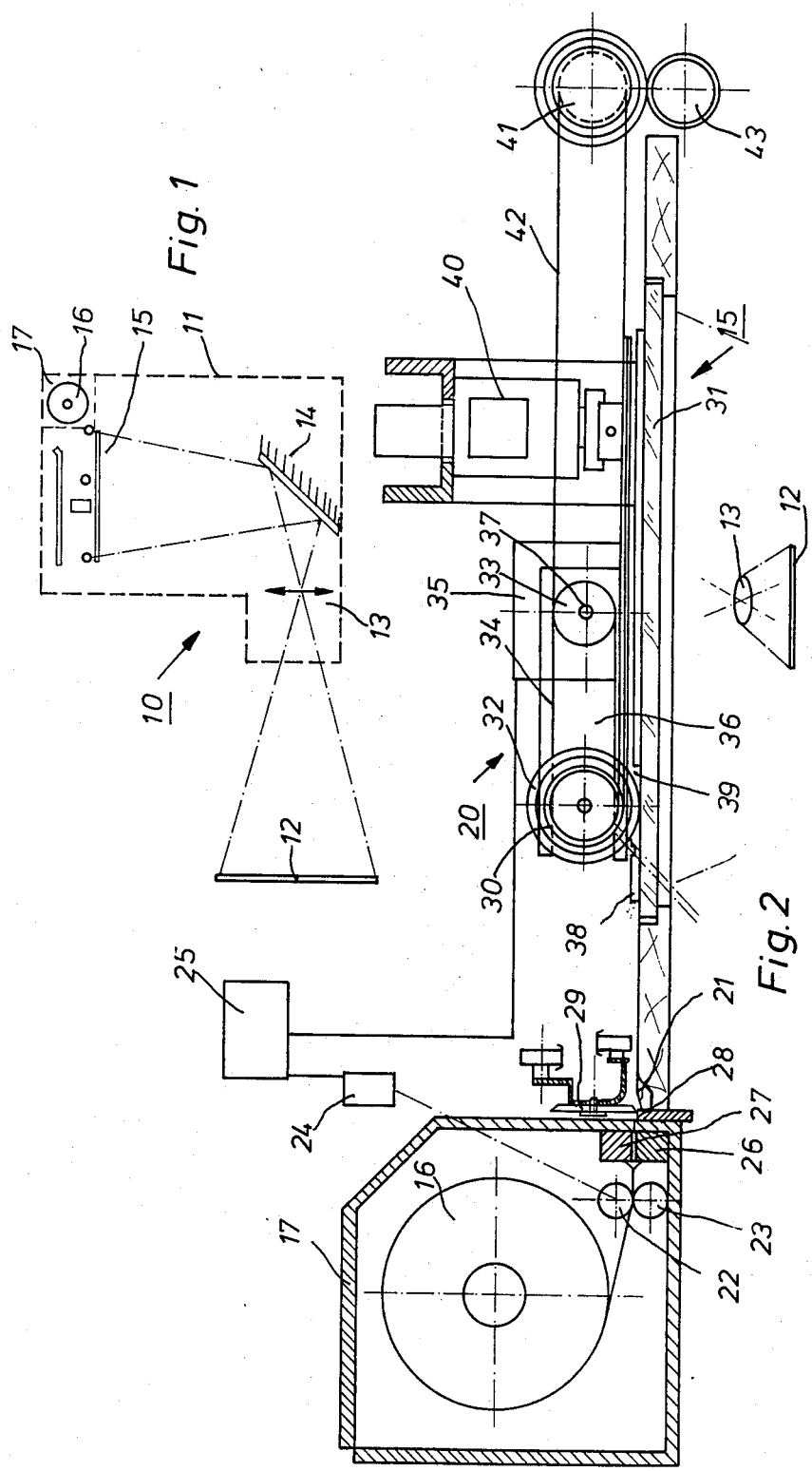

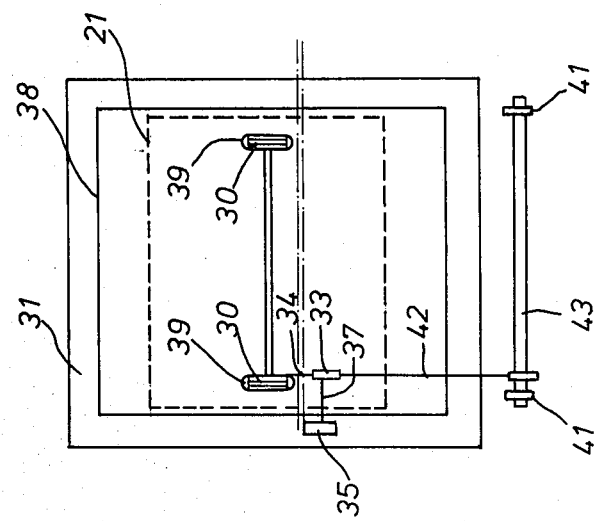
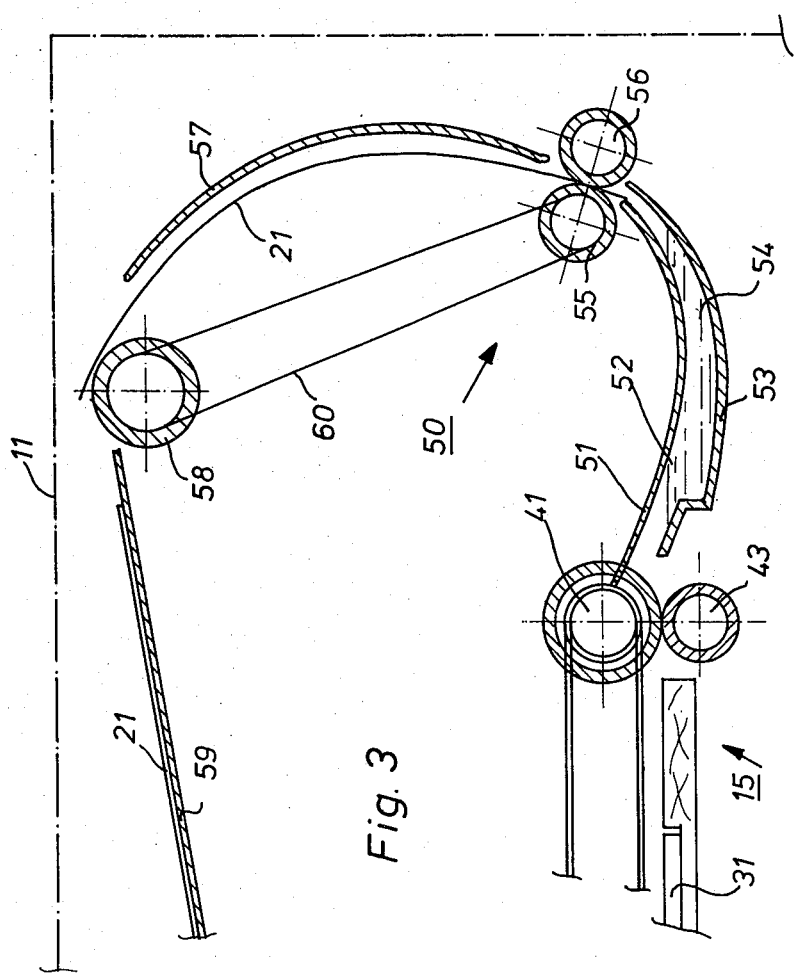

DAYLIGHT REPROGRAPHIC CAMERA

This invention is concerned with reprographic cameras and more particularly with a camera of this type intended for location in a well-lit area.

Reprographic cameras have been long used for a variety of tasks. More and more, there is a trend for taking such cameras out of the darkroom and for placing them in working areas where daylight or well-lit conditions prevail. This is done for several reasons such as increased convenience, the possibility of building up a reprographic department without having excessive investment for darkroom equipment and better working conditions for the camera operator.

Conventional reprographic cameras may be converted into units which may be installed in daylight conditions. To this end a supplementary housing is attached to the camera rear-side which is provided with a pair of hand access cuffs, via which access may be gained to the interior of the supplementary housing in a light-tight manner. In this supplementary housing are provided a supply of photosensitive material, so that the operator, via the access cuffs, can take a sheet from the stack and place it on the exposure frame. After exposure, the sheet is stored in a light-tight magazine, and after a series of exposures are made, the magazine is taken out of the supplementary housing for bulk processing the material contained therein.

More sophisticated reprographic camera units are provided with a built-in processing station for the chemical treatment of the photosensitive material after exposure.

More recent types of reprographic cameras have a light-tight magazine in which a roll of photosensitive material is housed, which photosensitive material is fed towards the exposure frame which is masked by a light-tight shield. After exposure, the photosensitive material located in the exposure frame is severed from the rest of the roll and subsequently processed.

The first type of reprographic cameras show the disadvantage that the exact positioning of the sheet of photosensitive material creates some problems in that no control as to the exact positioning of the sheet is carried out.

The second type of cameras referred to consume more photosensitive material than necessary, in that for each exposure an amount of material equal to the entire area of the exposure frame is fed to the latter whether this amount is integrally used for exposure or not.

It is therefore an object of the invention to provide a daylight reprographic camera which is adapted to work fully automatically and by means of which a substantial economization of photosensitive material may be realized.

According to the invention, there is provided:

A reprographic camera for use in daylight conditions comprising a camera body having a light-tight casing mounted on its rearside, said casing being provided with dispensing means for dispensing from a dispensing station a predetermined amount of photosensitive material from a roll located within said casing, positioning means for positioning the photosensitive material in an image receiving position in the image plane of said reprographic camera, and wherein said dispensing means and said positioning means are actuated by control means for a predetermined time which is a function of the length of material to be dispensed and positioned.

The dispensing and positioning means are driven by synchronous motors which are time-controlled. In so doing, reproducible speeds and consequently a reproducible supplying and positioning of photosensitive material may be realized. The timing means, required for controlling the predetermined periods of time referred to may be directly calibrated in current sheet formats, so that the latter may be reproducibly cut from the roll and positioned in the middle of the image plane of the camera. Since the entire area of the image plane is not integrally covered by the photosensitive material, a drastic decrease of the consumption of the latter may be realized.

The positioning means may be mounted upon a kind of balance arm, which brings said means in frictional relationship with the rear-side of the photosensitive material to be exposed. The balance arm may be operated via the intermediary of an electromagnet.

In order to increase the convenience of the reprographic camera according to the invention, it may be supplementarily equipped with a built-in processing station. This processing station can be kept very compact when so-called diffusion transfer reversal materials are to be exposed, in which instance only one processing solution is required for treating the material concerned.

In the latter case the processed material is delivered to a diffusion station in which it is kept for a minimum of time. In order to keep the unit compact, the diffusion station referred to is located in the housing above the processing station. The wet processed material may acquire a concave shape due to the curling tendency resulting from the stress difference between the stresses built up in the emulsion layer and in the support during processing. When feed rollers are provided at the concave side of the processed material, the latter is easily intercepted and fed without complications towards the diffusion station.

The term "photosensitive" covers silver halide photographic materials as well as non-silver halide materials, pre-sensitized offset plates and charged electrophotographic offset masters.

The scope and spirit of the invention will become more clearly understandable from the description of a preferred embodiment when read in the light of following figures in which:

FIG. 1 is a schematic representation of a daylight reprographic camera according to the invention, FIG. 2 is a view of the mechanism for feeding the photosensitive material from the supply station to the exposure station, FIG. 3 is a view of the processing and the diffusion stations and FIG. 4 is an elevational view of the system for feeding and positioning the photosensitive material.

As may be derived from FIG. 1, a daylight reprographic camera 10 according to the invention comprises a housing 11, a holder 12 for the original to be copied, an objective 13 (only schematically represented), which comprises a diaphragm and optional screening means for screening off photographically active light, an optional reversing mirror 14 and a camera rear part 15 coinciding with the image plane in which a photosensitive material may be located.

The photosensitive material is dispensed from a supply 16, which is provided in a separate light-tight magazine 17. For further details about the dispensing and processing of the photosensitive material reference is made to FIGS. 2, 3 and 4.

In the following description, it is assumed that the photosensitive material is a silver halide material used for treatment according to the Diffusion Transfer Reversal process.

So FIGS. 2 and 4 show the mechanism 20 for dispensing and positioning photosensitive material 21 in the image plane of the camera.

The photosensitive material 21 is supplied from a roll 16 rotatably journalled in a light-tight magazine 17 via a pair of transport rollers 22, 23 driven by a motor 24 (only schematically represented). Motor 24 is of the synchronous type and is driven through the intermediary of a timing unit 25.

The timing unit 25 causes the transport rollers 22,23 to be driven during a predetermined period of time which is a function of the required length of the photosensitive material 21 to be exposed. As such it may be calibrated directly in lengths instead of time. In order to guarantee that no ambient light enters the interior of the magazine 17, a pair of strips 26,27 of felt or similar material serve as light barrier at the exit opening 28 of the magazine 17.

Immediately downstream of said exit opening 28 is provided a knife 29, which is capable of transversely cutting the web of photosensitive material. The knife 29 is energized when the transport rollers 22,23 are arrested and the dispensing cycle has come to an end. The knife 29 is attached to an endless chain (not shown) transversely extending over the web of photosensitive material, which chain is driven by a suitable motor.

Rollers 22,23 may be driven by motor 24 through the intermediary of a pair of gear wheels (not shown). When such driving means is applied, the gear linked to the motor shall be uppermost, so that when the magazine 17 is rewound from the camera rear part it performs a small rotation in order to retract into the magazine the small strip of photosensitive material that protrudes through the exit slot 28 after severing.

Located downstream of knife 29 is another sheet transport roller system (see also FIG. 4), comprising at least two rollers 30. The distance between the knife 29 and the centre of rollers 30 defines the minimum length of photosensitive material that can be transported.

The task of rollers 30 is to take hold of the length of photosensitive material 21 that was cut from the roll and to bring it into the image plane 15, more precisely in the middle of the glass screen 31. Therefore, the peripheral surfaces of the rollers 30 are covered with a layer or coating 32 that has a frictional coefficient versus the rear-side of the photosensitive material which is higher than the frictional coefficient of the glass screen 31 versus the light-sensitive side of the photosensitive material. As a consequence, a sheet of photosensitive material 21 which arrives in the nip formed by the periphery of rollers 30 and the glass screen 31 becomes engaged therebetween and can be carried along.

The rollers are energized via a motor-driven wheel 33 and a belt 34 for a predetermined period of time, which period is set by the timer 25 controlling motor 35. In this case too the timer 25 may be directly calibrated as a function of the length of photosensitive material 21 cut from the roll 16. The time set will be the one that brings the sheet right in the middle of glass screen 31, where the best light distribution is realized.

The rollers 30 are mounted in a frame 36 that is pivotally mounted around shaft 37 of motor-driven wheel 33.

Also provided above the glass screen 31 is a platen 38 of light opaque material having openings 39 via which part of the rollers 30 protrude. The platen 38 is also capable of performing a small pivotal movement together and coinciding with that of rollers 30 around shaft 37. Pivoting may be controlled by electromagnet 40, the armature of which brings the periphery of rollers 30 to contact glass screen 31. The lowering of the rollers 30 by the electromagnet 40 and the starting of the rotation of said rollers are controlled by timer 25.

In addition rollers 30, another roller system comprising at least two rollers 41 is provided. Rollers 41 are driven in synchronism with wheel 33 via an endless belt 42. Rollers 41 co-operate with a roller 43 extending over the full width of the exposure frame 15 and carry the photosensitive material out of the exposure frame after exposure. One can readily deduce that the foregoing control system applying the general relation between transport time/format enables the camera to operate fully automatically because the feeding as well as the withdrawal of a sheet of photosensitive material may occur in a well-controlled fashion.

In order to guarantee that the coating 32 provided on rollers 30 is not subjected to wear, the transport of the photosensitive material out of the image plane will be so controlled that, when it is seized by the rollers 41,43 the rollers 30 are brought in upward direction, so that no frictional contact between the coating 32 and the glass screen 31 occurs.

Another method of feeding a sheet of photosensitive material into and out of the exposure frame 15 may consist in continuously driving rollers 30, but to lower them for only the period of time that the sheet has to be fed and positioned into the exposure frame and subsequently when the feed-out cycle starts. In that case the rollers 41 and belt 42, taking over the transport of the sheet out of the apparatus may be driven independently of rollers 30.

FIG. 3 shows the processing of the exposed photosensitive material 21 in a built-in processing station 50.

The processing station 50 comprises a developing tray 51 which is defined by two concavely shaped longitudinally extending shells 52 and 53 between which a predetermined amount of processing liquid 54 is provided.

In the embodiment illustrated, only one processing station 50 is provided, but it will be clear that, depending on the nature of the photosensitive material used, more than one of such stations may be incorporated. In FIG. 3 the processing of a diffusion transfer reversal (DTR)-material is illustrated. In this particular case, the DTR-material is of the one-sheet or monosheet type in which the negative and the positive layers are coated onto one single support. In contradistinction with so-called two-sheet DTR-systems, which involve the use of two separate sheets which are pressed together during processing and again separated after a predetermined time, in one-sheet systems the sandwhich is formed during manufacture and remains so after processing.

After processing the photosensitive material is taken by the transport/squeeze rollers 55, 56 and, via guide 57, intercepted by roller 58 and guided into a tray 59 where it remains during a predetermined minimum time in order to guarantee that the diffusion step (migration of unexposed silver complexes from the negative layer towards the positive layer and reduction to metallic silver on the so-called specks dispersed in the latter layer) is carried out adequately.

Roller 58 may be driven by one of the rollers 55 or 56 through an endless belt 60. As may be derived from the configuration of the processing station 50 in FIG. 3, the photosensitive material 21 is processed with its light-sensitive layer directed in downward direction. When subjecting such a material to a wet treatment, such as occurs during its processing, the light-sensitive layer, which comprises a dispersion of a light-sensitive component in gelatin will undergo dimensional fluctuations as a consequence of swelling. These fluctuations are greater than those of the support. As a consequence the processed material assumes a configuration as illustrated at 21 in FIG. 3 so that—if desired—the guide 57 may be omitted. For convenience sake, the roller 58 may be provided with a layer showing axially extending grooves that greatly facilitate the interception of the sheet and its conveyance into the tray 59.

It will also be clear that the various parts in the reprographic camera according to the invention may be replaced by their analogues. So the timer 25 may be replaced by a so-called program disk which controls the time of rotation of the synchronous motors involved in the transporting of the photosensitive material.

We claim:

1. A reprographic camera for waste-free exposure of photosensitive material under daylight conditions comprising a camera body having a fixed defined image plane and a light-tight casing mounted on its rear-side spaced from said image plane, a supply roll of a continuous web of photosensitive material situated within said casing, dispensing means associated with said casing for advancing outside said casing a selected variable length of the web of photosensitive material from said supply roll, severing means situated between said dispensing means and said image plane for separating from the material web the thus-advanced adjustable length thereof, transport means downstream of said severing means for transporting said severed variable length of material to an exposure position within the image plane of said reprographic camera, separate time-controlled synchronous motors for operating said dispensing means and transport means respectively at substantially fixed rates, and control means for energizing said synchronous motors for lengths of time which are a function of the selected variable length of material to be exposed.

2. A daylight reprographic camera according to claim 1, in which said transport means comprises synchronously driven rollers in frictional engagement with the rear-side of the latter.

3. A daylight reprographic camera according to claim 1, in which said transport means are movable bodily towards and away from said image plane and including means for moving said rollers into transporting relationship with said photosensitive material only during the time of transport of the latter.

4. A daylight reprographic camera according to claim 3, in which said transport means are mounted on a balance arm.

5. A daylight reprographic camera according to claim 4, in which said moving means comprises an electromagnet operatively connected to said balance arm.

6. A daylight reprographic camera according to claim 1, which comprises additional transporting means for advancing the exposed photosensitive material out of the image plane.

7. A daylight reprographic camera according to claim 1, which further comprises a processing station for processing the photosensitive material after its exposure.

8. A daylight reprographic camera according to claim 7, which further comprises a diffusion station and means to transport said photosensitive material from said processing station to said diffusion station.

9. A daylight reprographic camera according to claim 8, in which said diffusion station is located above said processing station.

10. A daylight reprographic camera according to claim 1, in which a light opaque platen is provided over the image plane, which is provided with openings through which sand transport means partly protrude.

11. A daylight reprographic camera according to claim 1, wherein said control means operates said transport means to position said selected variable length of material symmetrically lengthwise with said image plane.

* * * * *